US010878256B2

(12) United States Patent
Sakai et al.

(10) Patent No.: US 10,878,256 B2
(45) Date of Patent: Dec. 29, 2020

(54) TRAVEL ASSISTANCE DEVICE AND COMPUTER PROGRAM

(71) Applicant: AISIN AW CO., LTD., Anjo (JP)

(72) Inventors: Takamitsu Sakai, Nukata (JP); Nozomi Jimbo, Toyokawa (JP); Tomoaki Hirota, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 64 days.

(21) Appl. No.: 16/331,362

(22) PCT Filed: Oct. 9, 2017

(86) PCT No.: PCT/JP2017/036561
§ 371 (c)(1),
(2) Date: Mar. 7, 2019

(87) PCT Pub. No.: WO2018/066711
PCT Pub. Date: Apr. 12, 2018

(65) Prior Publication Data
US 2019/0197323 A1 Jun. 27, 2019

(30) Foreign Application Priority Data
Oct. 7, 2016 (JP) ................. 2016-199254

(51) Int. Cl.
G06K 9/00 (2006.01)
G08G 1/16 (2006.01)
(Continued)

(52) U.S. Cl.
CPC .......... G06K 9/00805 (2013.01); B60R 21/00 (2013.01); B60W 30/0956 (2013.01);
(Continued)

(58) Field of Classification Search
CPC .......... G06K 9/00805; G08G 7/50; G08G 1/16
See application file for complete search history.

(56) References Cited

U.S. PATENT DOCUMENTS 6,285,317 B1   9/2001 Ong
2009/0132161 A1   5/2009 Akita et al.

FOREIGN PATENT DOCUMENTS

EP   1378724 A1   1/2004
JP   2010-134639 A   6/2010
(Continued)

OTHER PUBLICATIONS

Apr. 30, 2019 Search Report issued in European Patent Application No. 17858547.7.
(Continued)

Primary Examiner — Myron Wyche
(74) Attorney, Agent, or Firm — Oliff PLC

(57) ABSTRACT

Travel assistance devices and programs obtain a captured image that captures a surrounding environment of a vehicle by an imaging device having a start point of a driver's line of sight and an optical axis corresponding to a driver's line-of-sight direction. The devices and programs identify, based on the captured image and map information of an area around the vehicle, a location where a connecting road is present in the captured image. The connecting road is a road connecting to a traveling road of the vehicle at a divergence point present around the vehicle. The devices and programs determine driver's visibility of the connecting road based on a positional relationship between the location of the connecting road and a location of an obstacle present around the vehicle in the captured image and output a result of the determination.

10 Claims, 6 Drawing Sheets

(51) Int. Cl.
| | | |
|---|---|---|
| *G06T 7/70* | (2017.01) | |
| *G06T 7/50* | (2017.01) | |
| *G06K 9/62* | (2006.01) | |
| *G06T 7/00* | (2017.01) | |
| *G06T 1/00* | (2006.01) | |
| *B60R 21/00* | (2006.01) | |
| *G01C 21/36* | (2006.01) | |
| *B60W 40/09* | (2012.01) | |
| *B60W 50/14* | (2020.01) | |
| *G06F 3/01* | (2006.01) | |
| *G06T 7/73* | (2017.01) | |
| *B60W 30/095* | (2012.01) | |
| *G01C 21/32* | (2006.01) | |

(52) U.S. Cl.
CPC ............ *B60W 40/09* (2013.01); *B60W 50/14* (2013.01); *G01C 21/32* (2013.01); *G01C 21/3697* (2013.01); *G06F 3/013* (2013.01); *G06K 9/00798* (2013.01); *G06K 9/00845* (2013.01); *G06K 9/6261* (2013.01); *G06T 1/00* (2013.01); *G06T 7/00* (2013.01); *G06T 7/50* (2017.01); *G06T 7/70* (2017.01); *G06T 7/73* (2017.01); *G08G 1/16* (2013.01); *B60W 2050/146* (2013.01); *G06K 2209/23* (2013.01); *G06T 2207/20081* (2013.01); *G06T 2207/30256* (2013.01); *G06T 2207/30261* (2013.01)

(56) References Cited

FOREIGN PATENT DOCUMENTS

| | | | | |
|---|---|---|---|---|
| JP | 2012-192878 A | 10/2012 | | |
| JP | 2014-120110 A | 6/2014 | | |
| JP | 2015-104930 A | 6/2015 | | |
| JP | 2015-108926 A | 6/2015 | | |
| JP | 2015108926 | * 11/2015 | ............... | G08G 1/16 |
| JP | 2016-060336 A | 4/2016 | | |
| WO | 2007/129382 A1 | 11/2007 | | |
| WO | 2016/070193 A1 | 5/2016 | | |

OTHER PUBLICATIONS

Nov. 7, 2017 Search Report issued in International Application No. PCT/JP2017/036561.

* cited by examiner

Overlapping percentage: 80%   Overlapping percentage: 20%

Narrow road width　　　　　　　　Wide road width

TRAVEL ASSISTANCE DEVICE AND COMPUTER PROGRAM

TECHNICAL FIELD

Related technical fields include travel assistance devices and computer programs that provide vehicle travel assistance.

BACKGROUND

In recent years, for example, as one type of travel assistance for a vehicle, travel assistance has been performed in which risk factors present around a mobile unit are determined and guidance, vehicle control, or the like, based on a result of the determination is performed. The risk factors are factors to which attention is to be paid when the mobile unit travels. Particularly, one of the risk factors is a road (hereinafter, referred to as connecting road) that connects to a traveling road of a vehicle at a divergence point present around the vehicle. The connecting road is a road having another vehicle, a pedestrian, a bicycle, etc., moving thereon and possibly entering the traveling road of the vehicle in the future. Thus, it is very important for a driver to grasp the presence of the connecting road to pay attention beforehand to such an entry of another vehicle, a pedestrian, a bicycle, etc.

Note, however, that even if there is a connecting road, if the connecting road has no obstacles therearound and thus can be clearly visually identified by the driver, then even if guidance on the connecting road has not been provided, the driver can clearly grasp the presence of the connecting road and thus there is very little necessity to provide assistance (e.g., guidance or vehicle control) targeting on the connecting road. On the other hand, it is desirable that a connecting road that is difficult for the driver to visually identify due to obstacles therearound serve as an assistance target. Therefore, to provide appropriate travel assistance to the driver, it is important to determine driver's visibility of a connecting road. In view of this, for example, JP 2012-192878 A discloses that during traveling of a vehicle, the locations and movement speeds of obstacles such as other vehicles present around the vehicle are detected in real time using a camera, a sensor, and a communication device installed on the vehicle, and when it is determined that a vehicle's blind spot region includes a connecting road and the risk level of the blind spot region is high, driving assistance to avoid another vehicle located on the connecting road is provided.

SUMMARY

However, in the above-described JP 2012-192878 A, though a blind spot region is determined in a bird's-eye view manner based on a positional relationship between a vehicle and another vehicle, a surrounding environment that can be actually visually identified by a driver is not considered, and thus, there has been a case in which a region determined to be a blind spot region differs from an actual driver's blind spot region. Therefore, a connecting road that is not actually included in a blind spot region is also determined to be a risk factor and thus may serve as an assistance target.

Exemplary embodiments of the broad inventive principles described herein solve the above-described conventional problem, and provide a travel assistance device and a computer program that allow to provide appropriate travel assistance for a connecting road by determining driver's visibility of the connecting road and outputting a result of the determination.

Exemplary embodiments provide travel assistance devices and programs obtain a captured image that captures a surrounding environment of a vehicle by an imaging device having a start point of a driver's line of sight and an optical axis corresponding to a driver's line-of-sight direction. The devices and programs identify, based on the captured image and map information of an area around the vehicle, a location where a connecting road is present in the captured image. The connecting road is a road connecting to a traveling road of the vehicle at a divergence point present around the vehicle. The devices and programs determine driver's visibility of the connecting road based on a positional relationship between the location of the connecting road and a location of an obstacle present around the vehicle in the captured image and output a result of the determination.

Note that the "visibility" may simply indicate only whether the driver can see the connecting road, and may also indicate the easiness to see the connecting road from the driver or the easiness to grasp the state of the connecting road by the driver. The above-described "visibility" is identified using an index for determining, for example, whether at least a part of the connecting road can be seen or whether a specific area of the connecting road can be seen, in addition to an index for determining whether the entire connecting road can be seen.

Note also that the expression "outputting a result of the determination" also includes performing vehicle control based on the result of the determination, in addition to providing guidance on the result of the determination.

According to the travel assistance device and computer program that have the above-described configurations, by determining driver's visibility of a connecting road and outputting a result of the determination, it becomes possible to provide appropriate travel assistance for the connecting road. For example, it becomes possible to limit unnecessary guidance or vehicle control as much as possible while providing travel assistance, such as guidance or vehicle control, for a connecting road that has low visibility and can possibly become a risk factor.

DETAILED DESCRIPTION OF EXEMPLARY EMBODIMENTS

Figure 1:
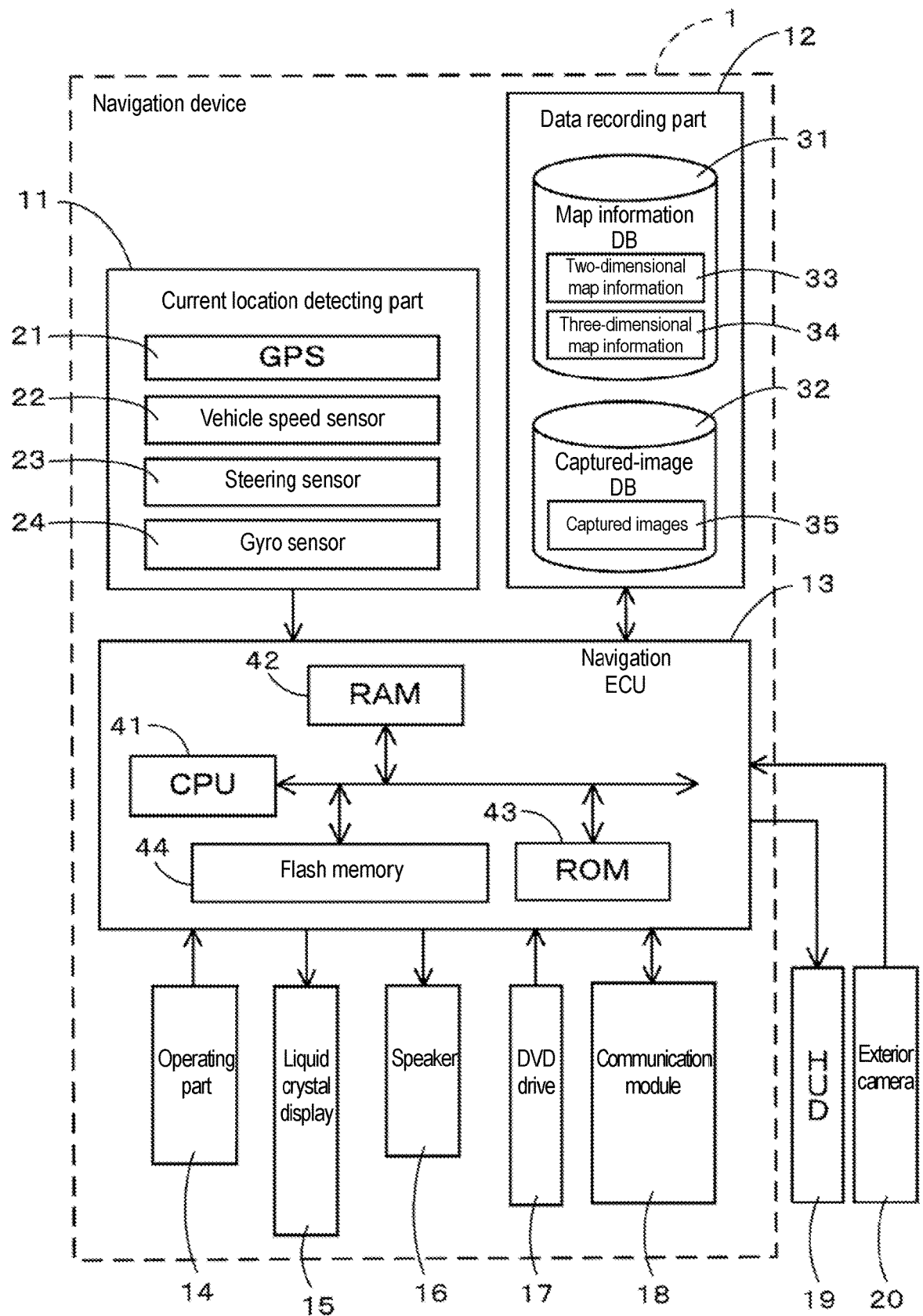
FIG. 1 is a block diagram showing a navigation device according to the present embodiment.

A travel assistance device will be described in detail below based on one embodiment that embodies a navigation device and with reference to the drawings. First, a schematic configuration of a navigation device 1 according to the present embodiment will be described using FIG. 1. FIG. 1 is a block diagram showing the navigation device 1 according to the present embodiment.

As shown in FIG. 1, the navigation device 1 according to the present embodiment includes a current location detecting part 11 that detects a current location of a vehicle having the navigation device 1 mounted thereon; a data recording part 12 having various types of data recorded therein; a navigation ECU 13 that performs various types of arithmetic processing based on inputted information; an operating part 14 that accepts operations from a user; a liquid crystal display 15 that displays a map of an area around the vehicle, information about a guided route set on the navigation device 1, etc., to the user; a speaker 16 that outputs audio guidance on route guidance, an alert against risk factors, etc.; a DVD drive 17 that reads a DVD which is a storage medium; and a communication module 18 that performs communication with information centers such as a probe center and a VICS (registered trademark: Vehicle Information and Communication System) center. As used herein, the term "storage medium" does not encompass transitory signals. In addition, a HUD (head-up display) 19 and an exterior camera 20 are connected to the navigation device 1 through an in-vehicle network such as a CAN.

Each component included in the navigation device 1 will be described below in turn.

The current location detecting part 11 includes a GPS 21, a vehicle speed sensor 22, a steering sensor 23, a gyro sensor 24, etc., and can detect the current location, orientation, and travel speed of the vehicle, the current time, etc. Here, particularly, the vehicle speed sensor 22 is a sensor for detecting the movement distance and vehicle speed of the vehicle, and generates pulses according to the rotation of drive wheels of the vehicle and outputs a pulse signal to the navigation ECU 13. Then, the navigation ECU 13 counts the generated pulses and thereby calculates the rotational speed of the drive wheels and a movement distance. Note that the navigation device 1 does not need to include all of the above-described four types of sensors and may be configured to include only one or a plurality of types of sensors among those sensors.

In addition, the data recording part 12 includes a hard disk (not shown) serving as an external storage device and a recording medium; and a recording head (not shown) which is a driver for reading a map information DB 31, a captured-image DB 32, a predetermined program, etc., recorded on the hard disk, and writing predetermined data to the hard disk. Note that the data recording part 12 may include a memory card or an optical disc such as a CD or a DVD instead of the hard disk. Note also that the map information DB 31 and the captured-image DB 32 may be stored on an external server, and the navigation device 1 may obtain the map information DB 31 and the captured-image DB 32 by communication.

Here, the map information DB 31 stores therein each of two-dimensional map information 33 and a three-dimensional map information 34. The two-dimensional map information 33 is general map information used in the navigation device 1 and includes, for example, link data about roads (links), node data about node points, facility data about facilities, search data used in a route search process, map display data for displaying a map, intersection data about each intersection, and retrieval data for retrieving points.

On the other hand, the three-dimensional map information 34 is information about a map image that three-dimensionally represents a map. Particularly, in the present embodiment, the three-dimensional map information 34 is information about a map image that three-dimensionally represents road outlines. Note that the map image may also represent other information than road outlines. For example, the map image may also three-dimensionally represent the shapes of facilities, the section lines of roads, road signs, signs, etc.

The navigation device 1 performs general functions such as display of a map image on the liquid crystal display 15 and a search for a guided route, using the two-dimensional map information 33. In addition, as will be described later, a process related to a determination of visibility of a connecting road is performed using the three-dimensional map information 34.

In addition, the captured-image DB 32 is storage means in which captured images 35 captured by the exterior camera 20 are stored. Note that the captured images 35 captured by the exterior camera 20 are cumulatively stored in the captured-image DB 32 and deleted in turn from the old ones.

Meanwhile, the navigation ECU (electronic control unit) 13 is an electronic control unit that performs overall control of the navigation device 1, and includes a CPU 41 serving as a computing device and a control device; and internal storage devices such as a RAM 42 that is used as a working memory when the CPU 41 performs various types of arithmetic processing and that stores route data obtained when a route is searched for, etc., a ROM 43 having recorded therein a travel assistance processing program (see FIG. 2) which will be described later, etc., in addition to a program for control, and a flash memory 44 that stores a program read from the ROM 43. Note that the navigation ECU 13 includes various types of means serving as processing algorithms. For example, surrounding environment imaging means obtains a captured image that captures the surrounding environment of the vehicle by the exterior camera 20 having a start point of a driver's line of sight and an optical axis corresponding to a driver's line-of-sight direction. Connecting road identifying means identifies, based on the captured image and map information of an area around the vehicle, a location where a connecting road is present in the captured image, the connecting road being a road connecting to a traveling road of the vehicle at a divergence point present around the vehicle. Visibility determining means determines driver's visibility of the connecting road, based on a positional relationship between the location of the connecting road and a location of an obstacle present around the vehicle in the captured image. Output means outputs a result of the determination made by the visibility determining means.

The operating part 14 is operated when, for example, a point of departure serving as a travel start point and a destination serving as a travel end point are inputted, and includes a plurality of operating switches such as various types of keys and buttons (not shown). Based on switch signals outputted by, for example, pressing each switch, the navigation ECU 13 performs control to perform corresponding various types of operation. Note that the operating part 14 may include a touch panel provided on the front of the liquid crystal display 15. Note also that the operating part 14 may include a microphone and an audio recognition device.

In addition, on the liquid crystal display 15 there are displayed a map image including roads, traffic information, operation guidance, an operation menu, guidance on keys, a guided route set on the navigation device 1, guidance information according to the guided route, news, a weather forecast, time, an e-mail, a TV program, etc. Note that in the present embodiment since the HUD 19 is provided as information display means, if the HUD 19 is configured to also perform the above-described display of a map image, etc., then the liquid crystal display 15 may be omitted.

In addition, the speaker 16 outputs audio guidance that provides guidance on travel along a guided route or guidance on traffic information, based on an instruction from the navigation ECU 13. In addition, in the present embodiment, particularly, guidance on a connecting road determined to have visibility lower than the threshold is also outputted.

In addition, the DVD drive 17 is a drive that can read data recorded on a recording medium such as a DVD or a CD. Then, based on the read data, for example, music or video is played back or the map information DB 31 is updated. Note that a card slot for performing reading and writing on a memory card may be provided instead of the DVD drive 17.

In addition, the communication module 18 is a communication device for receiving traffic information transmitted from traffic information centers, e.g., a VICS center and a probe center, and corresponds, for example, to a mobile phone or a DCM.

Meanwhile, the HUD 19 is placed in a vehicle's dashboard, and includes therein a liquid crystal display or a screen which is a video display surface on which video is displayed. The HUD 19 is configured such that the video displayed on the liquid crystal display or screen is further reflected onto a windshield in front of a driver's seat through a concave mirror, etc., included in the HUD 19, by which a vehicle's occupant visually identifies the video. Note that it is configured such that when the occupant visually identifies the video displayed on the liquid crystal display or screen and reflected onto the windshield, the video displayed on the liquid crystal display or screen is visually identified by the occupant as a virtual image in a position far ahead of the windshield instead of the position of the windshield. As a result, it becomes possible to allow the occupant to visually identify the virtual image superimposed on the real view of the environment ahead.

Note that the video displayed on the liquid crystal display or screen includes information about the vehicle and various types of information used to assist in occupant's driving. Particularly, in the present embodiment, information for informing the driver of a connecting road determined to have visibility lower than the threshold is displayed.

In addition, although in the present embodiment the HUD 19 is used as means for displaying an image superimposed on the real view of the environment ahead, other means may be used. For example, a windshield display (WSD) that displays video on the windshield may be used. For example, video may be displayed from a projector using the windshield as a screen, or the windshield may be a transmissive liquid crystal display. An image displayed on the windshield by the WSD is an image superimposed on the real view of the environment ahead as with the HUD 19.

Meanwhile, the exterior camera 20 is composed of, for example, a camera using a solid-state imaging device such as a CCD, and is attached to the back of a vehicle's rearview mirror, a vehicle's front bumper, etc., and is placed such that an optical-axis direction is downward at a predetermined angle relative to the horizontal. The exterior camera 20 captures an image of the surrounding environment ahead in a vehicle's traveling direction. In addition, the navigation ECU 13, as will be described later, determines the visibility of a connecting road present around the vehicle by comparing a captured image having been captured with an image of the three-dimensional map information 34. Note that the exterior camera 20 may be configured to be disposed on the side or rear of the vehicle, too. In addition, it is desirable to make an adjustment such that the placement position of the exterior camera 20 is substantially the same as a driver's eye position (a start point of the line of sight) and the optical-axis direction is substantially the same as a driver's line-of-sight direction obtained at normal times. By doing so, an image captured by the exterior camera 20 matches the driver's field of vision, enabling to more appropriately determine the visibility of a connecting road.

Note that, in the present embodiment, the visibility of a connecting road that is present in the driver's field of vision and that connects to a traveling road of the vehicle at a divergence point present around the vehicle is determined particularly based on a captured image of the exterior camera 20 and the three-dimensional map information 34. The above-described connecting road is a road having another vehicle, a pedestrian, a bicycle, etc., moving thereon and possibly entering the traveling road of the vehicle in the future. Hence, as will be described later, when the driver has low visibility of the connecting road (i.e., it is estimated that the driver has not been able to grasp the connecting road), guidance for allowing the driver to grasp the presence of the connecting road is provided.

Figure 2:
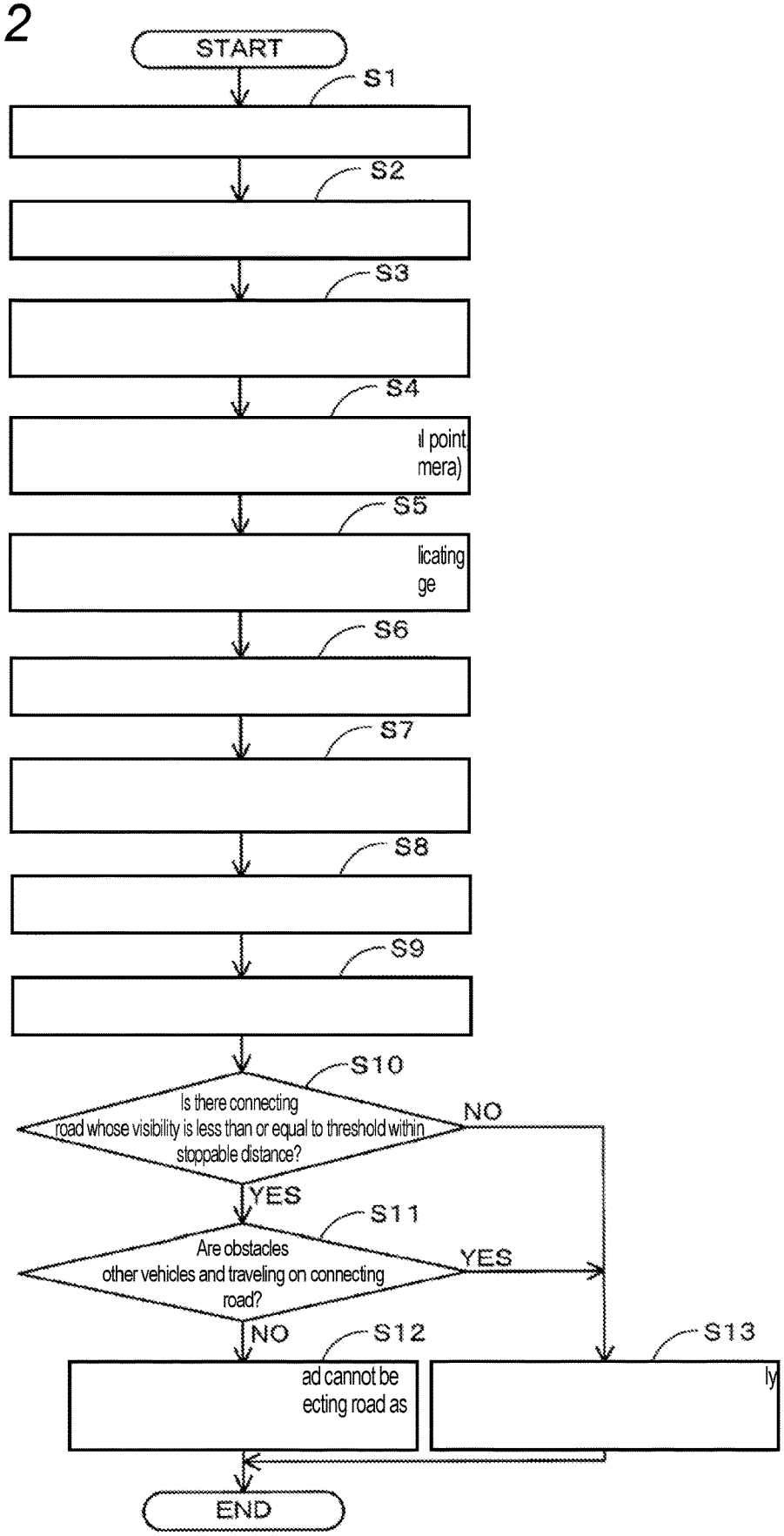
FIG. 2 is a flowchart of a travel assistance processing program according to the present embodiment.

Next, a travel assistance processing program executed by the CPU 41 in the navigation device 1 according to the present embodiment that has the above-described configuration will be described based on FIG. 2. FIG. 2 is a flowchart of the travel assistance processing program according to the present embodiment. Here, the travel assistance processing program is a program that is executed after turning on a vehicle's ACC (accessory) power supply, and determines the driver's visibility of a connecting road based on a captured image captured by the exterior camera 20 and the three-dimensional map information 34 and provides guidance on a connecting road with low visibility. In addition, the following program shown in the flowchart of FIG. 2 is stored in the RAM 42, the ROM 43, etc., included in the navigation ECU 13, and executed by the CPU 41.

First, in the travel assistance processing program, at step (hereinafter, abbreviated as S) 1, the CPU 41 obtains a vehicle's current location and orientation based on results of detection by the current location detecting part 11. Specifically, positional coordinates on a map that indicate a vehicle's current location are obtained using the two-dimensional map information 33. Note that upon detection of a vehicle's current location, a map-matching process for matching the vehicle's current location to the two-dimensional map information 33 is also performed. Furthermore, the vehicle's current location may be identified using a high-accuracy location technique. Here, the high-accuracy location technique is a technique allowing to detect a travel lane or a high-accuracy vehicle location by detecting, by image recognition, white line and road surface painting information captured from a camera placed on the vehicle and further checking the white line and road surface painting information against a map information DB stored in advance. Note that the details of the high-accuracy location technique are already publicly known and thus are omitted. Note that it is desirable that the vehicle's current location and orientation be ultimately identified on a map of the three-dimensional map information 34, too.

Then, at S2, the CPU 41 obtains a captured image captured recently by the exterior camera 20 from the captured-image DB 32. Note that the captured image captured by the exterior camera 20 is an image that captures the environment ahead in a vehicle's traveling direction, i.e., the environment ahead visually identified by the driver (driver's field of vision), to correspond to a start point of a driver's line of sight (eye point) and a driver's line-of-sight direction.

Subsequently, at S3, the CPU 41 obtains particularly three-dimensional map information 34 for an area around the vehicle's current location which is identified at the above-described 51 (e.g., an area within 300 m from the vehicle's current location) among the three-dimensional map information 34 stored in the map information DB 31.

Figure 3:
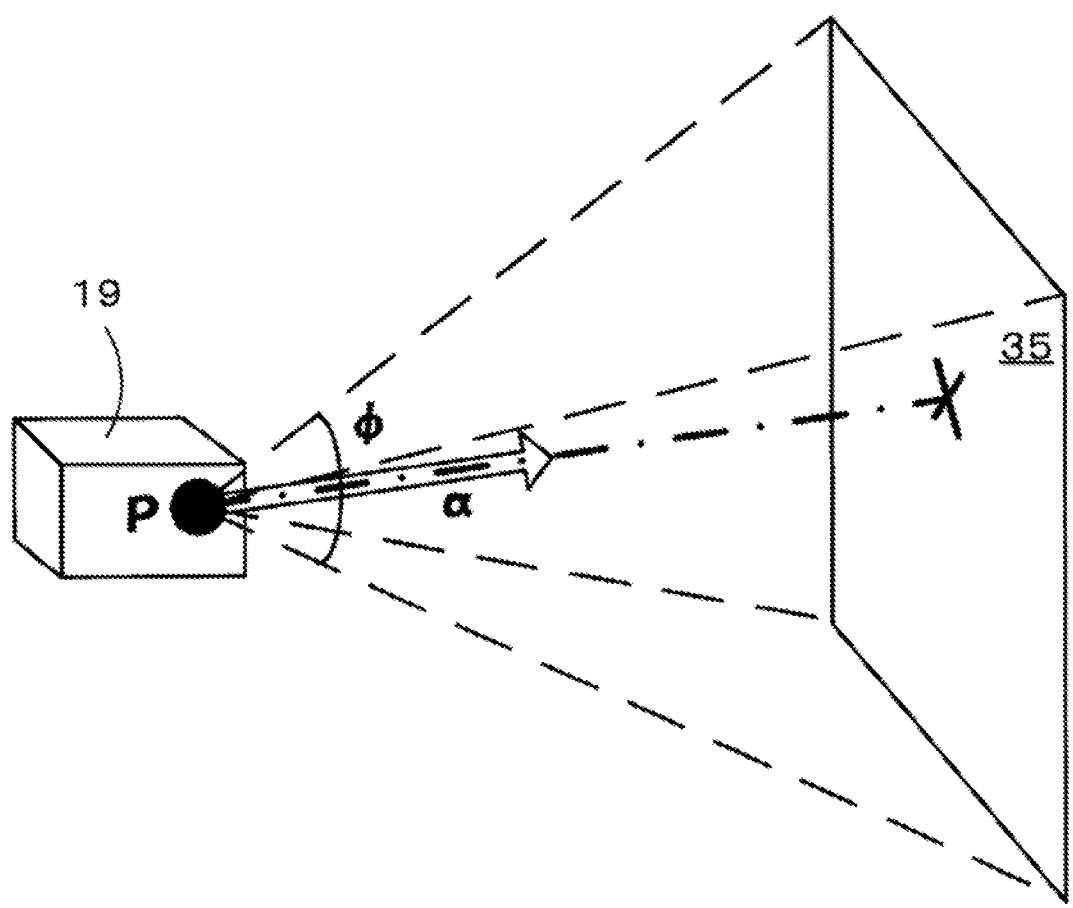
FIG. 3 is a diagram showing an image capturing range of a captured image.

Thereafter, at S4, the CPU 41 obtains an image capturing range of the captured image obtained at the above-described S2. Here, as shown in FIG. 3, the image capturing range of a captured image 35 can be identified by the position of a focal point P, an optical-axis direction α, and the angle of view ϕ of the exterior camera 20 obtained at the point in time of image capturing. Note that the angle of view ϕ is a fixed value which is determined in advance by the exterior camera 20. On the other hand, the position of the focal point P is determined based on the vehicle's current location obtained at the above-described S1 and the placement position of the exterior camera 20 in the vehicle. In addition, the optical-axis direction α is determined based on the vehicle's orientation obtained at the above-described S1 and the placement direction of the exterior camera 20 in the vehicle.

Then, at S5, the CPU 41 creates a bird's-eye-view image (hereinafter, referred to as a map information image) which three-dimensionally represents a map of the same range as the image capturing range of the captured image obtained at the above-described S4 from the same direction as an image capturing direction of the captured image, using the three-dimensional map information 34 obtained at the above-described S3. Note that the map information image itself is a two-dimensional image which is the same as the captured image.

Figure 4:
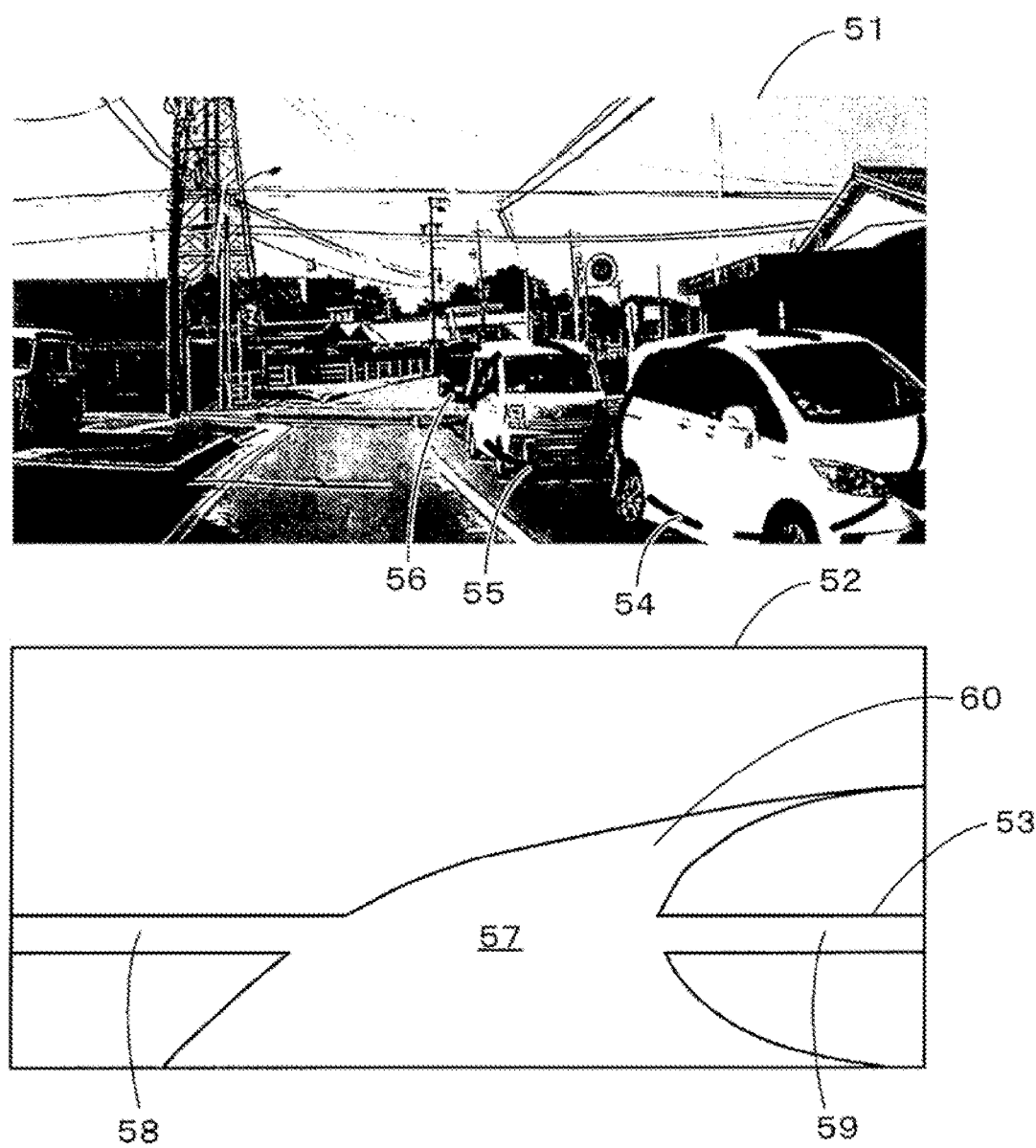
FIG. 4 is a diagram for comparison between a captured image and a map information image.

Here, FIG. 4 is a diagram showing an example of a map information image 52 created for a captured image 51. As shown in FIG. 4, the map information image 52 is an image in which lines indicating outlines 53 of roads included in an image capturing range of the captured image 51 (i.e., in the driver's field of vision) are drawn. In the map information image 52 there is also drawn an outline of a road which is hidden in the captured image 51 by obstacles such as other vehicles.

Subsequently, at S6, the CPU 41 detects obstacles located around the vehicle, by performing image recognition processes on the captured image obtained at the above-described S2. For the image recognition processes, a binarization process, a pattern matching process using feature points and a template, etc., are performed, but since those image recognition processes are already publicly known, the details thereof are omitted. In addition, at the above-described S3, each of the "type of an obstacle," "shape (detected range)," "distance from the vehicle," and "positional coordinates" is also obtained. The "type of an obstacle" includes, for example, an automobile, a pedestrian, and a bicycle. The "positional coordinates" are positional coordinates on the captured image with a rectangular coordinate system being set on the captured image. In addition, for a method of detecting an obstacle, detection may be performed using a sensor placed on the vehicle or information about an obstacle may be obtained from an external source by communication, in addition to detection from the captured image of the exterior camera 20. Note that an obstacle does not necessarily need to be one having a certain shape, and as long as the obstacle is an object that impedes the visibility of a connecting road, the obstacle may be, for example, light or darkness.

For example, in the example shown in FIG. 4, three vehicles 54 to 56 are detected as obstacles, and the "type of an obstacle," "shape (detected range)," "distance from the vehicle," and "positional coordinates" are identified for each of the vehicles 54 to 56.

Furthermore, at S7, the CPU 41 identifies the orientation (traveling direction) of each obstacle detected at the above-described S6 and a location where the obstacle is detected. Note that the "orientation (traveling direction) of the obstacle" may be identified from the type and shape of the obstacle, or may be identified based on changes in the location of the obstacle in captured images which are consecutively captured at a predetermined interval. In addition, for the "location where the obstacle is detected," it is identified, based on the positional coordinates of the obstacles detected at the above-described S6 and the map information image created at the above-described S5, whether each obstacle is located on a road or located on other than a road. Furthermore, when the obstacle is on a road, it is desirable to also identify whether the obstacle is located on a lane where the vehicle travels, or located on an opposite lane, or located on a connecting road. In addition, the above-described S7 is performed targeting on all obstacles detected at the above-described S6.

For example, in the example shown in FIG. 4, for the three vehicles 54 to 56, it is identified that the "orientation (traveling direction) of the obstacle" is backward (the opposite direction to the orientation of the vehicle). In addition, the "location where the obstacle is detected" is identified to be on an opposite lane.

Then, at S8, the CPU 41 sets a determination region for determining the visibility of a connecting road present in the driver's field of vision, on the captured image obtained at the above-described S2. Note that the 'connecting road' is a road that connects to a traveling road of the vehicle at a divergence point present around the vehicle. For example, in the example shown in FIG. 4, roads 58 and 59 connecting to a divergence point 57 correspond to connecting roads. Note that although in the present embodiment, particularly, the roads 58 and 59 connecting in a direction intersecting the traveling road of the vehicle serve as connecting roads, a road 60 connecting in the traveling direction may also be included in connecting roads. In addition, when there are a plurality of connecting roads, a determination region is set for each connecting road. Note that for a case in which there are no connecting roads in the captured image obtained at the above-described S2 (i.e., in the driver's field of vision) (a case in which a connecting road is hidden by obstacles, etc., and cannot be seen is also considered that there is a connecting road), the travel assistance process ends without performing processes at and after S8.

A method of setting a determination region at the above-described S8 will be described in more detail below using FIG. 5. The following description is made using, as an example, a determination region which is set for the connecting road 59 connecting in a right direction to the divergence point 57 present ahead in the vehicle's traveling direction.

First, the CPU 41 identifies a location where the connecting road 59 is present in the captured image 51, based on the map information image 52 created at the above-described S5. Specifically, an area in the captured image 51 corresponding to an area enclosed by an outline 53 of the connecting road 59 in the map information image 52 is identified. The identified area is a location where the connecting road 59 is present in the captured image 51. For example, in FIG. 5, a hatched region is a location where the connecting road 59 is present in the captured image 51. Subsequently, the CPU 41 identifies an end portion X in the captured image 51 at which the connecting road 59 connects to the divergence point 57 and is located nearest to the vehicle side, based on the identified location of the connecting road 59. Then, a rectangular region of 3 m in a direction going away from the connecting divergence point 57 along the connecting road 59 and 2 m in a height direction with the end portion X identified in the captured image 51 being a point of origin is set as a determination region 61. Likewise, a determination region is also set for other connecting roads.

Note that the determination region 61 set at the above-described S8 targets on the connecting road 59 present in the captured image 51, i.e., in the driver's field of vision, and is a region including at least a part of the connecting road 59. More specifically, the determination region 61 is set in a region including a road portion within 3 mm along the connecting road 59 from an end portion at which the connecting road 59 connects to the divergence point 57.

Then, at S9, the CPU 41 determines, based on a positional relationship between the location of a connecting road in the captured image obtained at the above-described S2 and the locations of the obstacles in the same captured image, the driver's visibility of the connecting road present in the captured image (i.e., in the driver's field of vision). Note that when there are a plurality of connecting roads, visibility is determined for each connecting road. Particularly, in the present embodiment, based on a positional relationship between the connecting road in the determination region set at the above-described S8 and the obstacles, the driver's visibility of the connecting road is determined.

Figure 6:
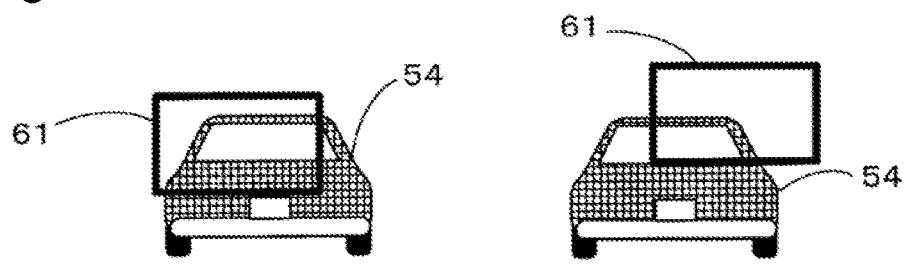
FIG. 6 is a diagram showing exemplary calculation of an overlapping percentage of the determination region and an obstacle.

A method of determining visibility at the above-described S9 will be described in more detail below using FIG. 6. The following description is made using, as an example, determination of visibility of the connecting road 59 connecting in the right direction to the divergence point 57 present ahead in the vehicle's traveling direction.

First, the CPU 41 identifies locations where the obstacles detected at the above-described S6 (in the example shown in FIG. 6, the vehicles 54 to 56) are present in the captured image 51. Then, an overlapping percentage of the vehicles 54 to 56 overlapping the determination region 61 is calculated. Specifically, as shown in FIG. 6, a percentage of an overlapping area of the vehicles 54 to 56 in the area of the entire determination region 61 is calculated as an overlapping percentage. Note that the locations and shapes of the vehicles 54 to 56 are detected at the above-described S6. Then, the calculated overlapping percentage is set as a numerical value indicating the driver's visibility of the connecting road 59. Note that when the calculated overlapping percentage (visibility) is greater than or equal to a threshold (e.g., 80%), the CPU 41 determines that the corresponding connecting road cannot be visually identified by the driver, and when the overlapping percentage is less than the threshold, the CPU 41 determines that the corresponding connecting road can be visually identified by the driver.

Figure 8:
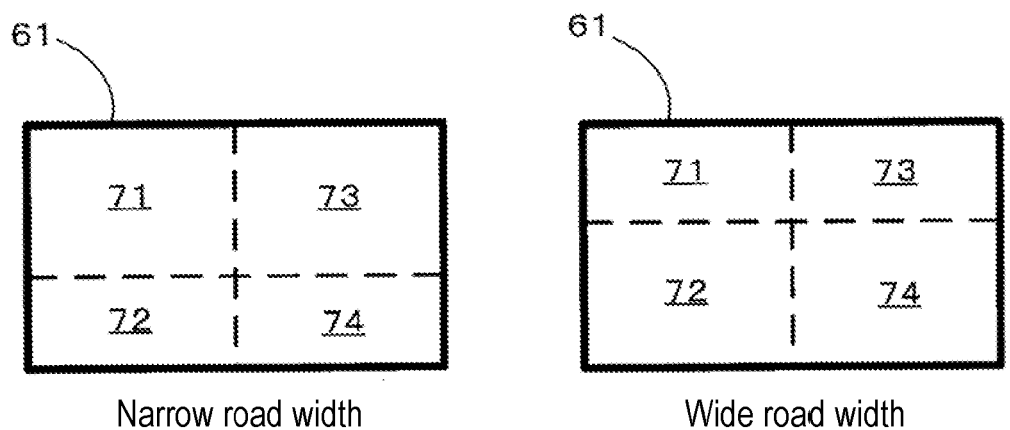
FIG. 8 is a diagram showing examples of division of the determination region.

In addition, as shown in FIG. 8, the determination region 61 may be divided into a plurality of sections. For example, FIG. 8 shows an example in which the determination region 61 is divided into four sections 71 to 74 with lines connecting the midpoints of opposite sides being boundaries. Furthermore, in the present embodiment, as shown in the following (A) and (B), it is also possible to set different visibility calculation criteria for the different sections 71 to 74. Note that the following description is made with an upper left section being a section 71, a lower left section being a section 72, an upper right section being a section 73, and a lower right section being a section 74.

(A) As an example, such calculation criteria are set that a higher overlapping percentage is likely to be calculated for a section closer from the end portion connecting to the divergence point among the plurality of sections 71 to 74. Here, since the section closer from the end portion connecting to the divergence point is a section located near an entrance to the connecting road, the section is an important section particularly when the driver determines whether there is a vehicle or a pedestrian entering the traveling road of the vehicle from the connecting road. Thus, such calculation criteria are set that a higher overlapping percentage is likely to be calculated for a section closer from the end portion connecting to the divergence point.

Figure 5:
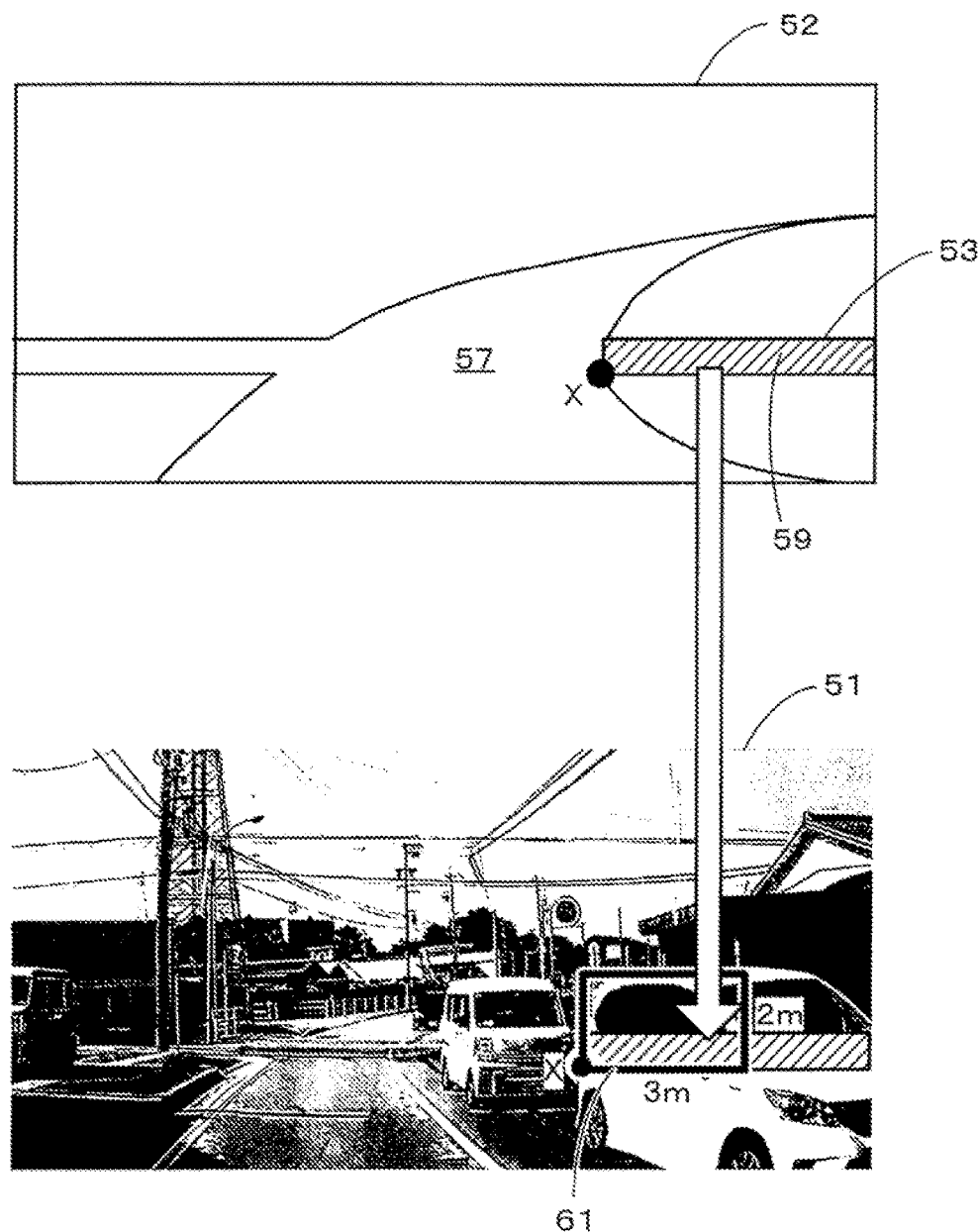
FIG. 5 is a diagram showing a determination region set on the captured image.

For example, for the determination region 61 set for the connecting road 59 connecting in the right direction to the divergence point 57 present ahead in the vehicle's traveling direction as shown in FIG. 5, such calculation criteria are set that a higher overlapping percentage is likely to be calculated for the sections 71 and 72 close to the divergence point 57 than for the sections 73 and 74. For example, for the sections 71 and 72, a percentage obtained by multiplying a percentage of obstacles actually overlapping the sections 71 and 72 by a factor of 1.2 is calculated as an overlapping percentage. On the other hand, for the sections 73 and 74, a percentage obtained by multiplying a percentage of obstacles actually overlapping the sections 73 and 74 by a factor of 0.8 is calculated as an overlapping percentage. Then, a value obtained by totaling the overlapping percentages calculated for each section is determined to be an overlapping percentage of the obstacles overlapping the determination region 61.

Note that a determination region set for a connecting road connecting to the divergence point in a left direction is left-right reversed with respect to the above-described example.

(B) As another example, such calculation criteria are set that a higher overlapping percentage is likely to be calculated for a section more on the lower side among the plurality of sections 71 to 74. Here, since, as shown in FIG. 5, a lower edge of the determination region 61 is set based on the end portion X on a side of the connecting road 59 near the vehicle, the percentage of overlap with the connecting road 59 is higher for the sections 72 and 74 on the lower side than for the sections 71 and 73 on the upper side. Namely, since a section on the lower side is a section where a vehicle or a pedestrian moving on the connecting road is highly likely to be located, the section is an important section particularly when the driver determines whether there is a vehicle or a pedestrian entering the traveling road of the vehicle from the connecting road. Therefore, such calculation criteria are set that a higher overlapping percentage is likely to be calculated for a section more on the lower side.

For example, for the sections 72 and 74, a percentage obtained by multiplying a percentage of obstacles actually overlapping the sections 72 and 74 by a factor of 1.2 is calculated as an overlapping percentage. On the other hand, for the sections 71 and 73, a percentage obtained by multiplying a percentage of obstacles actually overlapping the sections 71 and 73 by a factor of 0.8 is calculated as an overlapping percentage. Then, a value obtained by totaling the overlapping percentages calculated for each section is set as an overlapping percentage of the obstacles overlapping the determination region 61.

Note that the above-described (A) and (B) may be combined. In that case, for the sections 71, 72, and 74, a percentage obtained by multiplying a percentage of obstacles actually overlapping the sections 71, 72, and 74 by a factor of 1.2 is calculated as an overlapping percentage. On the other hand, for the section 73, a percentage obtained by multiplying a percentage of obstacles actually overlapping the section 73 by a factor of 0.8 is calculated as an overlapping percentage. Then, a value obtained by totaling the overlapping percentages calculated for each block is set as an overlapping percentage of the obstacles overlapping the determination region 61. Furthermore, for the section 72, the multiplication factor may be 1.4.

In addition, the boundaries that divide the determination region 61 may be changed according to the road width of the connecting road. Specifically, as shown in FIG. 8, when the road width of the connecting road is narrow, a boundary that divides the upper and lower portions is allowed to move to the lower side, and when the road width of the connecting road is wide, the boundary that divides the upper and lower portions is allowed to move to the upper side. By doing so, an overlapping percentage can be more appropriately corrected in the above-described (B).

Then, at S10, the CPU 41 determines whether there is a connecting road which is present within a stoppable distance from the vehicle and whose overlapping percentage (visibility) calculated at the above-described S9 is greater than or equal to the threshold (e.g., 80%), i.e., which is present in the driver's field of vision and cannot be visually identified by the driver. Note that the 'stoppable distance' is a distance within which the vehicle can stop at predetermined acceleration (with an upper limit that does not place strain on the driver) or less, and is calculated based on the current vehicle speed of the vehicle. In addition, the threshold serving as a determination criterion at the above-described S10 can be changed as appropriate and may be, for example, 50%. In addition, the threshold may be allowed to be changed depending on the surrounding environment. For example, a higher threshold is set for a poor visibility environment such as at night or in rain than for other environments.

Then, if it is determined that there is a connecting road which is present within a stoppable distance from the vehicle and whose overlapping percentage (visibility) calculated at the above-described S9 is greater than or equal to the threshold (e.g., 80%), i.e., which cannot be visually identified by the driver (S10: YES), processing transitions to S11. On the other hand, if it is determined that there is no connecting road whose overlapping percentage (visibility) calculated at the above-described S9 is greater than or equal to the threshold (e.g., 80%) or that, even if there is such a connecting road, the connecting road is out of the stoppable distance (S10: NO), processing transitions to S13.

At S11, the CPU 41 determines whether the obstacles overlapping the connecting road are vehicles and the vehicles are located on the connecting road, based on the types of the obstacles identified at the above-described S6 and the orientations (traveling directions) and detection locations of the obstacles identified at the above-described S7. Here, even if the connecting road cannot be visually identified due to another vehicle overlapping the connecting road, if the other vehicle is a vehicle traveling on the connecting road, then the driver can grasp the location and shape of the connecting road to some extent from the location of the other vehicle, and can also determine whether there is a vehicle entering the traveling road of the vehicle from the connecting road. Thus, in such a case, even if the connecting road has visibility less than or equal to the threshold, the driver is exceptionally considered to be able to visually identify the connecting road.

Then, if it is determined that the obstacles overlapping the connecting road are vehicles and the vehicles are located on the connecting road (S11: YES), processing transitions to S13. On the other hand, if it is determined that the obstacles overlapping the connecting road are other than vehicles or that, even if the obstacles are vehicles, the vehicles are not located on the connecting road (S11: NO), processing transitions to S12.

At S12, the CPU 41 transmits a control signal to the HUD 19, and outputs video informing of the presence of the connecting road that is determined to be not visually identifiable by the driver (hereinafter, referred to as invisible road) to the liquid crystal display of the HUD 19. Specifically, a superimposed image which is superimposed on a range of the invisible road that includes the end portion connecting to the divergence point, and visually identified by the driver is displayed. In addition, a sound alerting the driver to the invisible road may be outputted from the speaker 16.

Figure 9:
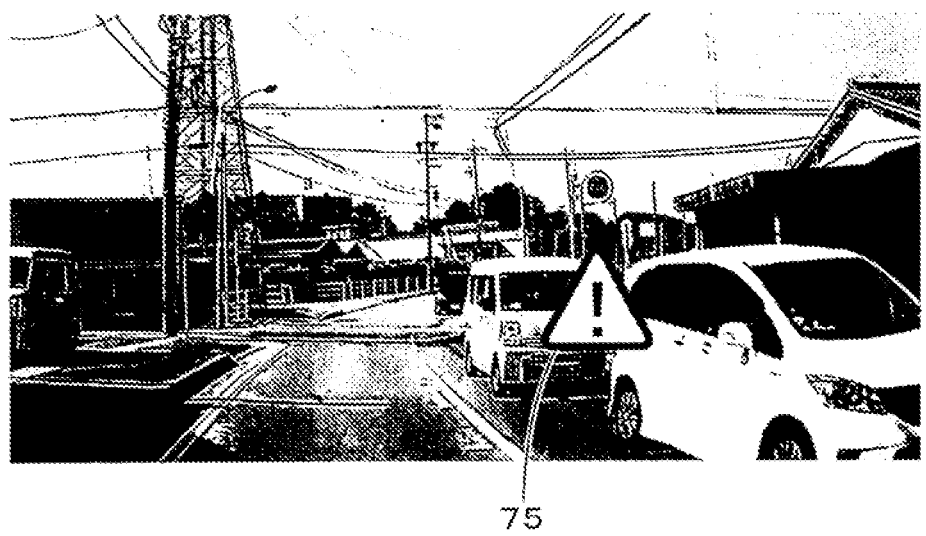
FIG. 9 is a diagram showing an example of a superimposed image that provides guidance on an invisible road.

For example, FIG. 9 is a diagram showing an example of a superimposed image displayed at the above-described S12.

As shown in FIG. 9, a virtual image (superimposed image) 75 of an exclamation mark informing of the presence of an invisible road is displayed in a position that is a predetermined distance (25 m) ahead in the vehicle's traveling direction. Particularly, since the virtual image 75 is superimposed on a range of the invisible road that includes the end portion connecting to the divergence point, i.e., an area near the entrance to the invisible road, and visually identified by the driver, even if there is another vehicle or a pedestrian entering the traveling road of the vehicle from the invisible road, the driver can pay attention beforehand to the entry of another vehicle or a pedestrian.

In addition, it is desirable that the size of the superimposed image displayed at the above-described S12 increases as the distance from the vehicle to the invisible road decreases. By doing so, it becomes possible to allow the driver to visually grasp the distance to the invisible road.

On the other hand, at S13, the CPU 41 determines that there is no connecting road in the captured image (i.e., in the driver's field of vision) that cannot be visually identified by the driver, and thus ends the travel assistance process without providing any particular guidance on a connecting road.

Note that in the present embodiment, as output means for outputting a result of a determination made for the driver's visibility of a connecting road, particularly, guidance informing the driver of the presence of an invisible road determined to be not visually identifiable by the driver (the visibility is less than or equal to the threshold) is provided, but as the output means for outputting a result of a determination, vehicle control based on the result of a determination may be performed. For example, it is possible to perform vehicle control for allowing the driver to notice an invisible road, or vehicle control to avoid an invisible road. Specifically, there is vehicle control that performs deceleration just before an invisible road. In addition, it is also possible to apply a result of a determination to a self-driving vehicle.

Furthermore, if machine learning can determine what risk factors are present on an invisible road, then guidance that more specifically identifies a risk factor (e.g., "pay attention to a pedestrian entering from a crossroad present in a blind spot ahead of the vehicle") may be provided.

As described in detail above, the navigation device 1 and a computer program executed by the navigation device 1 according to the present embodiment obtain a captured image that captures the surrounding environment of a vehicle (S2); obtain a map information image which is a map image that three-dimensionally represents a map and that represents the same range as an image capturing range of the captured image from the same direction as an image capturing direction of the captured image (S5); determine, based on the captured image and the map information image, driver's visibility of a connecting road which is a road connecting to a traveling road of the vehicle at a divergence point present around the vehicle (S10); and output a result of the visibility determination (S12). Thus, it becomes possible to provide appropriate travel assistance for the connecting road. For example, it becomes possible to limit unnecessary guidance or vehicle control as much as possible while providing travel assistance, such as guidance or vehicle control, for a connecting road that has low visibility and can possibly become a risk factor.

Note that various improvements and modifications may, of course, be made without departing from the broad inventive principles.

For example, although in the present embodiment the three-dimensional map information 34 is information about a map image that three-dimensionally represents road outlines, the three-dimensional map information 34 may be map information representing information other than road outlines. For example, the map image may also represent the shapes of facilities, the section lines of roads, road signs, signs, etc.

In addition, although in the present embodiment, as guidance informing the driver of an invisible road, an image superimposed on an area near an entrance to the invisible road and visually identified is displayed (FIG. 9), the superimposed image may be an image in other modes. For example, an image of line segments superimposed on an outline of an invisible road and visually identified may be displayed.

Figure 7:
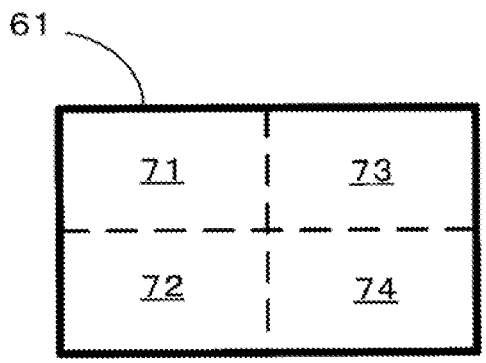
FIG. 7 is a diagram showing an example of division of the determination region.

In addition, although in the present embodiment the determination region 61 has a rectangular shape which is 3 m wide and 2 m long, the size and shape of the determination region 61 can be changed as appropriate, and for example, a circular shape may be adopted. In addition, although FIG. 7 shows an example in which the determination region 61 is divided into four sections, the number of divisions may be three or less, or five or more.

In addition, although in the present embodiment the travel assistance processing program (FIG. 2) is executed by the navigation device 1, the travel assistance processing program may be configured to be executed by an in-vehicle device other than the navigation device. For example, the travel assistance processing program may be configured to be executed by a control part of the HUD 19, a vehicle control ECU, or other in-vehicle devices. Note that when the control part of the HUD 19 executes the travel assistance processing program, the travel assistance device can also be configured by the HUD 19. In addition, instead of an in-vehicle device performing all processes, an external server may perform some of the processes.

In addition, although an implementation example in which the travel assistance device is embodied is described above, the travel assistance device can also have the following configurations, and in that case, the following advantageous effects are provided.

For example, a first configuration is as follows:

A travel assistance device includes surrounding environment imaging means (41) for obtaining a captured image that captures the surrounding environment of a vehicle by an imaging device (20) having a start point of a driver's line of sight and an optical axis corresponding to a driver's line-of-sight direction; connecting road identifying means (41) for identifying, based on the captured image and map information of an area around the vehicle, a location where a connecting road is present in the captured image, the connecting road being a road connecting to a traveling road of the vehicle at a divergence point present around the vehicle; visibility determining means (41) for determining driver's visibility of the connecting road, based on a positional relationship between the location of the connecting road and a location of an obstacle (54 to 56) present around the vehicle in the captured image; and output means (41) for outputting a result of the determination made by the visibility determining means.

According to the travel assistance device having the above-described configuration, by determining driver's visibility of a connecting road and outputting a result of the determination, it becomes possible to provide appropriate travel assistance for the connecting road. For example, it becomes possible to limit unnecessary guidance or vehicle control as much as possible while providing travel assistance, such as guidance or vehicle control, for a connecting road that has low visibility and can possibly become a risk factor.

In addition, a second configuration is as follows:

The travel assistance device includes obstacle detecting means (41) for detecting a location and a shape of the obstacle present around the vehicle from the captured image, and the visibility determining means (41) determines the driver's visibility of the connecting road, based on the location and shape of the obstacle detected by the obstacle detecting means.

According to the travel assistance device having the above-described configuration, it becomes possible to determine accurate driver's visibility of a connecting road particularly when the visibility of the connecting road is impeded by an obstacle present around the vehicle.

In addition, a third configuration is as follows:

The travel assistance device includes determination region setting means (41) for setting a determination region (61) in a region including at least a part of the connecting road in the captured image, the determination region (61) serving as a target for determining the visibility of the connecting road, and the visibility determining means (41) determines the driver's visibility of the connecting road, based on a positional relationship between the connecting road and the obstacle in the determination region.

According to the travel assistance device having the above-described configuration, since the visibility of a connecting road is determined based on a positional relationship between the connecting road and an obstacle in a specific region including a part of the connecting road, it becomes possible to determine the visibility of the connecting road considering particularly a region that is important when the driver grasps the connecting road.

In addition, a fourth configuration is as follows:

The determination region setting means (41) sets the determination region (61) in a region including a road portion of the connecting road within a predetermined distance along the connecting road from an end portion connecting to the divergence point.

According to the travel assistance device having the above-described configuration, since visibility is determined targeting on particularly a range near an entrance to a connecting road, it becomes possible to determine the visibility of the connecting road considering whether the driver can visually identify a last-minute vehicle or pedestrian entering a traveling road of the vehicle from the connecting road.

In addition, a fifth configuration is as follows:

The visibility determining means (41) calculates an overlapping percentage of the obstacle overlapping the determination region (61), and determines the driver's visibility of the connecting road, based on the calculated overlapping percentage.

According to the travel assistance device having the above-described configuration, it becomes possible to determine accurate driver's visibility of a connecting road particularly when the visibility of the connecting road is impeded by an obstacle present around the vehicle.

In addition, a sixth configuration is as follows:

The visibility determining means (41) divides the determination region (61) into a plurality of sections, and calculates the overlapping percentage using different calculation criteria for the different plurality of sections.

According to the travel assistance device having the above-described configuration, it becomes possible to determine the visibility of a connecting road considering particularly the visibility in a section of the determination region that is important when the driver grasps the connecting road.

In addition, a seventh configuration is as follows:

The visibility determining means (41) sets such calculation criteria that a higher overlapping percentage is likely to be calculated for a section closer from the end portion connecting to the divergence point among the plurality of sections.

According to the travel assistance device having the above-described configuration, it becomes possible to determine the visibility of a connecting road placing importance on particularly the visibility in a section of the determination region near an entrance to the connecting road.

In addition, an eighth configuration is as follows:

The visibility determining means (41) sets such calculation criteria that a higher overlapping percentage is likely to be calculated for a section more on a lower side among the plurality of sections.

According to the travel assistance device having the above-described configuration, it becomes possible to determine the visibility of a connecting road placing importance on particularly the visibility in a section of the determination region that has a high percentage of overlap with the connecting road.

In addition, a ninth configuration is as follows:

The visibility determining means (41) changes a boundary that divides the determination region (61), according to a road width of the connecting road.

According to the travel assistance device having the above-described configuration, it becomes possible to appropriately divide particularly a section of the determination region that has a high percentage of overlap with a connecting road, according to the road width of the connecting road.

In addition, a tenth configuration is as follows:

The visibility determining means (41) determines that a driver cannot visually identify the connecting road when the overlapping percentage is greater than or equal to a threshold, and determines that the driver can visually identify the connecting road when the overlapping percentage is less than the threshold.

According to the travel assistance device having the above-described configuration, it becomes possible to accurately determine whether the driver can visually identify a connecting road from an overlapping percentage of an obstacle present around the vehicle and the connecting road, particularly when the visibility of the connecting road is impeded by the obstacle.

In addition, an eleventh configuration is as follows:

The visibility determining means (41) determines, when the obstacle (54 to 56) is another vehicle located around the vehicle, whether the other vehicle is located on the connecting road; and determines, when it is determined that the other vehicle is located on the connecting road, that the driver can visually identify the connecting road, regardless of a positional relationship between the location of the connecting road and a location of the other vehicle in the captured image.

According to the travel assistance device having the above-described configuration, even if the visibility of a connecting road is impeded by an obstacle present around the vehicle, when the obstacle is a vehicle moving on the connecting road, it can be exceptionally determined that the driver can visually identify the connecting road.

The invention claimed is:

1. A travel assistance device comprising:
 a processor programmed to:
   obtain a captured image that captures a surrounding environment of a vehicle by an imaging device having a start point of a driver's line of sight and an optical axis corresponding to a driver's line-of-sight direction;
   identify, based on the captured image and map information of an area around the vehicle, a location where a connecting road is present in the captured image, the connecting road being a road connecting to a traveling road of the vehicle at a divergence point present around the vehicle;
   set a determination region in a region including a road portion of the connecting road in the captured image within a predetermined distance along the connecting road from an end portion connecting to the divergence point, the determination region serving as a target for determining a driver's visibility of the connecting road;
   determine the driver's visibility of the connecting road based on a positional relationship between the connecting road and an obstacle in the determination region; and
   output a result of the determination.

2. The travel assistance device according to claim 1, wherein the processor is programmed to:
 detect a location and a shape of the obstacle present around the vehicle from the captured image; and
 determine the driver's visibility of the connecting road, based on the detected location and shape of the obstacle.

3. The travel assistance device according to claim 1, wherein the processor is programmed to:
 calculate an overlapping percentage of the obstacle overlapping the determination region; and
 determine the driver's visibility of the connecting road, based on the calculated overlapping percentage.

4. The travel assistance device according to claim 3, wherein the processor is programmed to:

divide the determination region into a plurality of sections; and calculate the overlapping percentage using different calculation criteria for each of the plurality of sections.

5. The travel assistance device according to claim 4, wherein the processor is programmed to set the calculation criteria such that a higher overlapping percentage is likely to be calculated for a section closer from an end portion connecting to the divergence point among the plurality of sections.

6. The travel assistance device according to claim 4, wherein the processor is programmed to set the calculation criteria such that a higher overlapping percentage is likely to be calculated for a section more on a lower side among the plurality of sections.

7. The travel assistance device according to claim 4, wherein the processor is programmed to change a boundary that divides the determination region, according to a road width of the connecting road.

8. The travel assistance device according to claim 3, wherein the processor is programmed to:

determine that a driver cannot visually identify the connecting road when the overlapping percentage is greater than or equal to a threshold; and determine that the driver can visually identify the connecting road when the overlapping percentage is less than the threshold.

9. The travel assistance device according to claim 8, wherein the processor is programmed to:

determine, when the obstacle is another vehicle located around the vehicle, whether the other vehicle is located on the connecting road; and determine, when it is determined that the other vehicle is located on the connecting road, that the driver can visually identify the connecting road, regardless of a positional relationship between the location of the connecting road and a location of the other vehicle in the captured image.

10. A computer-readable storage medium storing a computer-executable travel assistance program that causes a computer to perform functions, comprising:

obtaining a captured image that captures a surrounding environment of a vehicle by an imaging device having a start point of a driver's line of sight and an optical axis corresponding to a driver's line-of-sight direction;

identifying, based on the captured image and map information of an area around the vehicle, a location where a connecting road is present in the captured image, the connecting road being a road connecting to a traveling road of the vehicle at a divergence point present around the vehicle;

setting a determination region in a region including a road portion of the connecting road in the captured image within a predetermined distance along the connecting road from an end portion connecting to the divergence point, the determination region serving as a target for determining a driver's visibility of the connecting road;

determining the driver's visibility of the connecting road based on a positional relationship between the connecting road and an obstacle in the determination region; and outputting a result of the determination.

* * * * *